United States Patent Office 3,733,340
Patented May 15, 1973

3,733,340
BASIC SUBSTITUTED KETOSTEROIDS
Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed Aug. 10, 1970, Ser. No. 62,619
Int. Cl. C07c 169/20, 169/32
U.S. Cl. 260—397.4                    12 Claims

ABSTRACT OF THE DISCLOSURE

Compounds are prepared having the formula

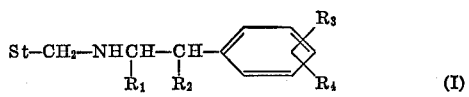

where $R_1$ is hydrogen or lower alkyl, $R_2$ is hydrogen or hydroxyl, $R_3$ and $R_4$ are hydrogen, halogen, hydroxy, lower alkyl or lower alkoxy and St is a steroid radical which is connected to the methylene group by the grouping

of the ring A, B, C or D or by a side chain $R_6$, said steroid having the general formula

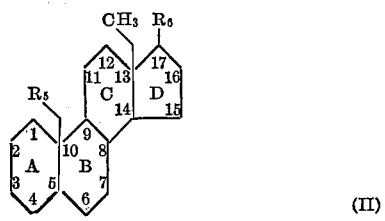

which is derived from etiocholane or etioallocholane series, the connection with the basic portion of the molecule being either a ring carbon atom or the C–17 side chain, the steroid being either unsubstituted or containing one or more hydroxy, lower alkoxy, lower alkyl, or acyloxy groups, e.g. lower alkanoyloxy or benzoyloxy and containing either no double bonds or containing one or more double bonds, ring A or both rings A and B can be aromatic, $R_5$ is methyl or a double bond and $R_6$ either forms a keto group with the No. 17 ring carbon atom or is hydrogen or an alkyl group of 1 to 12 carbon atoms, or alkenyl or alkinyl of 2 to 12 carbon atoms. The compounds can be prepared as optically active or diastereometric forms or as salts. They are useful primarily in the pharmaceutical field, e.g. to increase coronary blood flow,

---

The present invention is directed to novel compounds having the formula

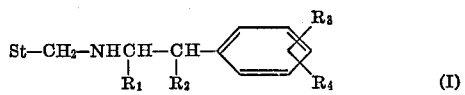

where $R_1$ is hydrogen or lower alkyl, $R_2$ is hydrogen or hydroxyl, $R_3$ and $R_4$ are hydrogen, halogen, hydroxy, lower alkyl or lower alkoxy and St is a steroid radical which is connected to the methylene group by the grouping

of the ring A, B, C or D or by a side chain $R_6$, said steroid having the general formula

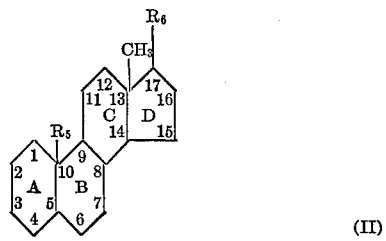

which is derived from etiocholane or etioallocholane series, the connection with the basic portion of the molecule being either a ring carbon atom or the C–17 side chain, the steroid being either unsubstituted or containing one or more hydroxy, lower alkoxy, lower alkyl, or acyloxy groups, e.g. lower alkanoyloxy or benzoyloxy and containing either no double bonds or containing one or more double bonds, ring A or both rings A and B can be aromatic, $R_5$ is methyl or a double bond and $R_6$ either forms a keto group with the No. 17 ring carbon atom or is hydrogen or an alkyl group of 1 to 12 carbon atoms, or alkenyl or alkinyl of 2 to 12 carbon atoms. The compounds can be prepared as optically active or diastereometric forms or as salts.

A preferred class of compounds has the formula

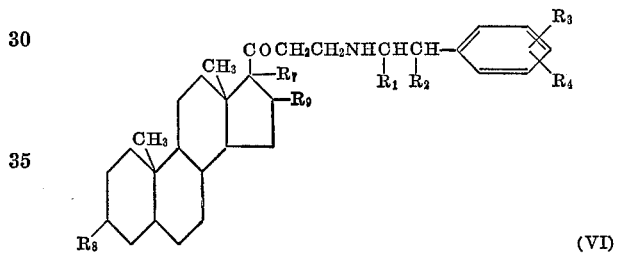

where $R_1$, $R_2$, $R_3$, and $R_4$ are as defined above, $R_8$ is a hydroxyl group or an acyloxy group of the formula alkyl COO— where the alkyl is a lower alkyl group of 1–6 carbon atoms, $R_9$ is hydrogen or a lower alkyl group of 1–5 carbon atoms and $R_7$ is hydrogen or hydroxyl. The steroid ring system in a given case can have a carbon to carbon double bond in the 5, 6 position and/or the 16, 17 position.

Another class of preferred compounds are those within Formula I wherein the symbol St is the androsteronyl or isoandrosteronyl group.

In the compounds of Formulae I and II the alkyl and alkoxy groups can be straight or branched chain and preferably contain 1 to 6 carbon atoms except $R_6$ which preferably can contain up to 12 carbon atoms in the alkyl group. The acyl group is preferably derived from a lower aliphatic carboxylic acid, e.g. an alkanoic acid of 2 to 7 carbon atoms or benzoic acid.

The steroid side chain $R_6$ likewise can be straight or branched chain and in a given case is substituted by hydroxy, acyloxy or alkoxy. There can be a double bond directly between C atom 16 and $R_6$. The substituents of the steroid radical including $R_5$ and $R_6$ can be in the $\alpha$ or $\beta$ position.

Of special importance are steroid radicals which aside from a substitution on the C atoms 10, 13 or 17 are mono or disubstituted in the steroid rings by hydroxy, alkoxy (e.g. of 1–6 carbon atoms, acyloxy (e.g. from an alkanoic acid of 2 to 7 carbon atoms or benzoic acid) or alkyl (e.g. of 1–6 carbon atoms).

The compounds of the invention are pharmacologically and pharmaceutically active, especially in heart and circulatory diseases. They cause a widening of the coronary artery and increase the contraction strength of the heart.

The production of the compounds of the invention can take place, for example by reacting in a known manner (a) A compound of the general formula

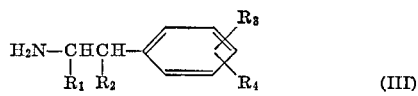

with a ketosteriod of general Formula II as defined above which contains at least one, in a given case additional, methylene group conjugated with the keto group

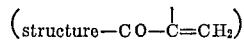

or with a corresponding Mannich base substituted by a lower alkyl group on the nitrogen, or with a ketosteroid of general Formula II in the presence of formaldehyde or a formaldehyde forming substance; or (b) Reducing a compound of the general formula

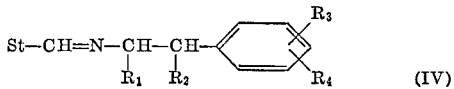

or

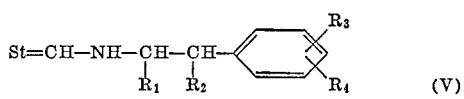

to a compound of general Formula I and, in a given case, converting the base obtained by process (a) or (b) into its pharmacologically acceptable acid addition salts and/or in a given case if the compound obtained has an acyloxy group, deacylating.

As used in the claims the formulae are intended to cover the free bases as well as the acid addition salts unless otherwise indicated.

The corresponding Mannich bases from ketosteroids of general Formula II with a conjugated methylene group have the structural element

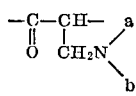

where $a$ and $b$ are lower alkyl group.

These Mannich bases are derived from the ketosteroids where $a$ and $b$ are lower alkyl group.

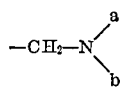

Process (a) is carried out in general at a temperature between 20 and 150° C. in a solvent or suspension medium, for example alcohols, e.g. methyl alcohol, ethyl alcohol, propyl alcohol or butyl alcohol, ethylene glycol dimethyl ether, dioxane, glacial acetic acid, ether, acetone, chloroform, benzene, toluene or even water. In the case of the use of a ketosteroid with a conjugated methylene group the process is preferably carried out at 20–80° C. in a medium such as ether, acetone, dioxane or chloroform. When using Mannich bases preferably there are employed as solvents water, alcohol-water or rather a two-phase system such as water-benzene or water-toluene.

Process (b) is suitably carried out with hydrogen in the presence of a known hydrogenation catalyst such as platinum oxide, palladium, Raney-nickel in a solvent or suspension agent, for example methanol, ethanol, acetic acid or ethyl acetate. In general one works at somewhat higher temperatures, for example at 20–50° C.

Likewise reduction with nascent hydrogen is possible, as for example with non noble melts in the presence of acids, sodium amalgam, sodium+alcohol, etc.

The starting material for process (b) can be produced by condensing a ketosteroid of Formula II with a formic acid ester, e.g. methyl formate or ethyl formate, in the presence of a basic condensation agent, for example sodium, sodium alcoholate, e.g. sodium ethylate, sodium hydride or sodium amide with separation of the alcohol (ester condensation) and the formyl compound obtained reacted with an amine of general Formula III whereby there is formed Compound IV or V.

The deacylation is carried out for the most part in a temperature range between 20 and 120° C. in the presence of an acid, for example hydrochloric acid, sulfuric acid, etc. As the solvent there can be used for example water, alcohols, dioxane, ethylene glycol dimethyl ether, etc., preferably as a mixture.

The compounds obtained which contain optically active carbon atoms and as a rule are obtained as racemates can be split into their optically active isomers by known methods by means of an optically active acid. It is also possible from the first to add optically active or also diastereometric starting materials whereby the end product will retain a corresponding pure optically active form or diastereometric configuration. Unless otherwise indicated the claims are intended to cover both the optically active and racemic forms of the compounds as well as the diastereometric forms.

The conversion into salts can take place by known methods. As anions for the salts there can be employed the known pharmaceutically usable acid residues, e.g. hydrochlorides, hydrobromides, sulfates, maleates, tartrates, malates, toluene sulfonates, acetates, etc.

The compounds of the invention were tested on dogs (whole animal) for their activity in increasing coronary blood flows.

Also they were tested on the isolated guinea pig heart by the method of Langendorff (Pflugers Arch. 61 (1895) 291) for their activity in regard to coronary blood flow, amplitude and heart frequency.

Toxicity testing was done on mice with oral feeding by determining the acute toxicity ($LD_{50}$ in mg./kg.) according to the method of Miller and Tainter (Proc. Soc. Exper. Biol. a Med. 57 (1944) 261).

The compounds of the invention caused an increase of coronary blood flow in dogs (entire animal) in the dosage range of 0.05 to 5 mg./kg. body weight in vivo (intravenous injection).

Furthermore, the compounds of the invention effected an increase in coronary blood flow on the isolated Langendorff heart of the guinea pig in the dosage range of 5 to 500 µg./heart. Several of the compounds also increased the contraction strength. At a dosage of 100 µg./per heart on the isolated Langendorff heart of the guinea pig there was an increased coronary blood flow, for example, of 80–150%. The duration of the effect is pronouncedly long and for example is between 10 and 100 minutes.

The compounds are useful for improving the blood flow of the heart.

Their use is indicated in coronary insufficiency, angina pectoris and myocardia infarction.

The pharmacological handling of the compounds is according to the customary standard methods used with conventional heart and circulatory active compounds. Their administration can be carried out, for example, enterally, parenterally, orally or perlingually.

Pharmacological testing for the evaluation of the activity can be carried out, for example, using papaverine as the comparison material.

The pharmaceutical medicaments containing one or more of the compounds can be employed enterally, parenterally, orally or perlingually or in the form of sprays. The compounds can be used by themselves or in admixture with other pharmaceutically or pharmacologically active materials as well as in a given case with further additives such as pharmaceutical carries.

Dispensing can be in the form of tablets, capsules, pills, dragees, plugs, salves, powders, liquids or aerosols. As liquids there can be employed oleaginous or aqueous solutions or suspensions, emulsions e.g. injectable aqueous or oleaginous solutions or suspensions. A preferred form of use is as tablets containing 10 to 100 mg. e.g. 50 mg. of active substance of solutions containing 0.25–2.5%, e.g. 1% of active substance.

The individual dose can be dispensed in a manner customary in the art and lies between 5 and 50 mg. e.g. 25 mg. The individual doses can be dispensed one or more times a day.

For example it is recommended that there be employed 1–3 tablets having a content of 20 mg. of active material three times a day or intravenous injection 1 to 3 times a day of a 2 ml. ampule having 5 mg. of active substance.

The acute toxicity of the compounds of the invention on mice (expressed by the $LD_{50}$ mg./kg. is for example in oral application between 400 and 4000 mg./kg.).

The compounds can be used to treat humans or in veterinary medicine, e.g. to treat dogs, cats, and horses.

The compounds and their salts, e.g. the hydrochlorides also are useful as curing agents for melamine-formaldehyde resins.

Typical steroids from which the steroid radical can be derived according to the invention are for example pregnane and allo pregnane, their alkyl, hydroxy and acyloxy derivatives for example pregnanone-3, pregnanone-20, allo-pregnanone-3, allo-pregnanone-20, pregnanol - 3α - one - 20, pregnanol - 3β - one - 20, allo-pregnanol - 3α - one - 20, allo-pregnanol-3β-one-20-acetate, pregnen - 16 - ol - 3β - one - 20 acetate, allo-pregnen-16-ol - 3β - one - 20 acetate, pregnen-5-ol-3β-one-20, 3β-acetoxy - 17α - hydroxypregnen - 5 - one-20, 16α-methyl-pregnen - 5 - ol - 3β - one - 20, pregnadiene-5,16-ol-3β-one-20-acetate, 6 - methylpregnadiene-5,16-ol-3β-one-20-acetate, 16 - methylpregnadiene-5,16-ol-3β-one-20-acetate; androstane and etiocholane and their alkyl, alkenyl alkinyl, hydroxy and acyloxy derivatives, for example androstanone-3, etiocholanone-3, androstanone-17, etiocholanone-17, androsterone, 5 - isoandrosterone, etiocholanol-3α - one - 17, androstanol - 17α - one - 3, etiocholanol-17β - one - 3, dehydroandrosterone, dehydro-5-isoandrosterone, 11β - hydroxy androsterone, 11β - hydroxy-etiocholanol - 3α - one - 17, cholestane, coprostane, testosterone and their acetates, propionates, valerates, benzoates, epi (=iso) testosterone, 17α - methyl testosterone and 17α-ethinyl testosterone, estrone and its O-acyl or O-alkyl derivatives, for example estrone acetate, estrone methyl ether, 24-ethyl cholestadiene-4,22-one 3; equilin and equilenin.

While not all of the above steroids are included in the working examples below all of those listed above can be so employed to make the appropriate corresponding compounds of the invention.

Unless otherwise indicated all parts and percentages are by weight.

EXAMPLE 1

21 - [1 - phenyl-1-hydroxypropyl-(2)-aminomethyl]-3β-acetoxypregnen-5-one-20

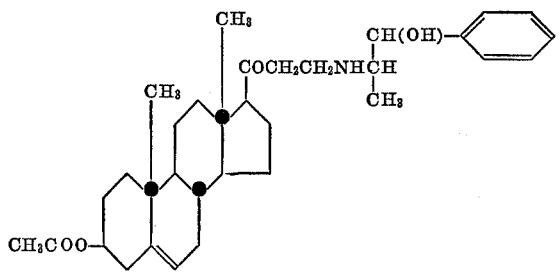

14.4 grams (0.04 mol) of pregnenolone acetate, 2.1 grams (0.068 mol) of paraformaldehyde and 12.8 grams (0.068 mol) of 1-norephedrine. HCl were heated under reflux in 300 ml. of ethylene glycol dimethyl ether for 30 hours and the solvent was partially distilled off. The crude HCl salt crystallized from the residue and was recrystallized from 80 ml. of ethanol, M.P. 216–219° C.

EXAMPLE 2

21 - [1-phenyl-1-hydroxypropyl-(2)-amino-methyl]-3β hydroxypregnen-5-one-20.

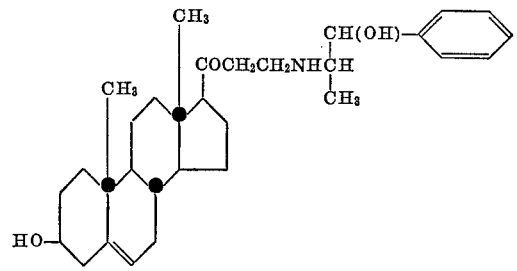

101.2 grams (0.32 mol) of pregnenolone, 12.5 grams (0.416 mol) of paraformaldehyde and 60 grams (0.32 mol) of 1-norephedrine. HCl were heated under reflux in 720 ml. of isopropanol for 3 days. On the second and third days there were added respectively 2 grams of paraformaldehyde and 2 ml. of 7 normal isopropanolic HCl. The solvent was distilled off and the residue treated with 700 ml. of acetone whereby 75 grams of the HCl salt crystallized. This was recrystallized twice from 200 ml. of ethanol. M.P. 206–207° C.

EXAMPLE 3

21 - [1-(4-hydroxyphenyl)-1-hydroxy-propyl-(2)-aminomethyl]-3β-hydroxy-pregnen-5-one-20.

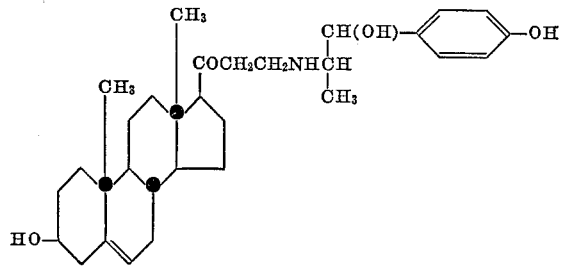

31.5 grams (0.1 mol) of pregnenolone, paraformaldehyde and 20.1 grams (0.1 mol) of p-hydroxy-norephedrine. HCl were heated for 2 days under reflux in 250 ml. of ethanol. The paraformaldehyde was added as four 2 gram portions, the first portion initially and the remaining 3 portions at 12-hour intervals. The solvent was distilled off. The residue was treated successively with ether, acetone and water. There remained 15 grams of undissolved crude HCl salt which was recrystallized successively from 150 ml. of isopropanol, 80 ml. of propanol and 40 ml. of ethanol, M.P. 190–192° C.

EXAMPLE 4

21 - [3,4 - dimethoxy - phenethyl-aminomethyl]-3β-hydroxypregene-5-one-20

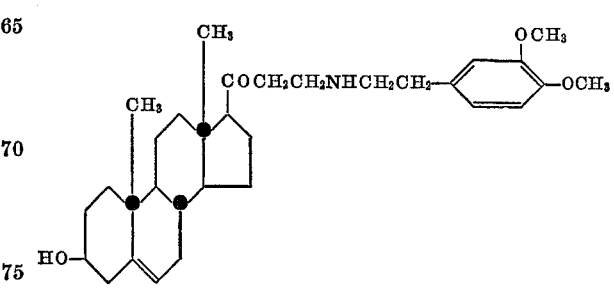

12.65 grams (0.04 mol) of pregnenolone, 1.5 grams (0.05 mol) of paraformaldehyde and 8.7 grams (0.04 mol) of homoveratrylamine. HCl was heated under reflux for 4 hours in 100 ml. of isopropanol, whereby after 1 hour an additional 1 gram of paraformaldehyde was added. The solvent was distilled off and the residue treated with ether, acetone and water. There remained undissolved 3.2 grams of crude HCl salt which was recrystallized from 150 ml. of ethanol. M.P. 196–198° C.

EXAMPLE 5

21 - [2 - (4-t-butylphenyl)-2-hydroxy-ethylaminomethyl]-3β-hydroxypregnen-5-one-20.

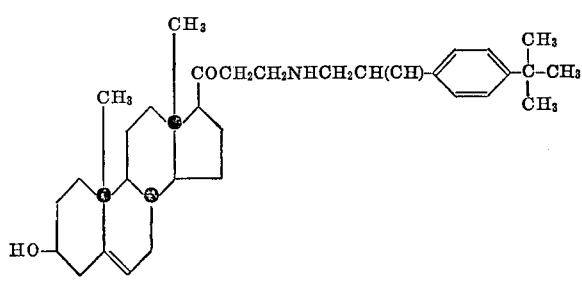

3.8 grams (0.02 mol) of 2 - (4 - t-butylphenyl)2-hydroxyethyl amine and 8.2 grams (0.02 mol) of 21-dimethylaminomethyl pregnenolone. HCl were held at 50° C. for 2 hours in 100 ml. of 50% aqueous ethanol and allowed to stand overnight whereby the crude base precipitated. It was recrystallized from acetone. 5 grams of the base (M.P. 92–94° C.) were neutralized in 50 ml. of isopropanol with isopropanolic HCl (about 7 normal) and the HCl salt precipitated with ether. 3.8 grams of HCl salt were recrystallized from 50 ml. of 70% ethanol. M.P. 147–148° C.

EXAMPLE 6

21 - [2 - (4-chlorophenyl)-2-hydroxyethyl-aminomethyl]-3β-hydroxypregnen-5-one-20.

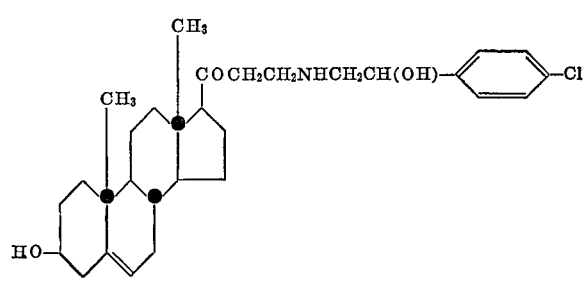

3 grams (0.0176 mol) of 2-(4-chlorophenyl)-2-hydroxyethyl amine and 7.25 grams (0.0176 mol) of 21-dimethylaminomethyl pregnenolone. HCl were held in 100 ml. of 50% ethanol at 50° C. for 3 hours and allowed to stand overnight. The oily crude base was treated with ether and the insoluble residue in 50 ml. of isopropanol was neutralized with isopropanolic HCl (about 7 normal). By precipitation with ether there were obtained 4 grams of the HCl salt which was treated with 80 ml. of isopropanol at room temperature and the insoluble portion recrystallized from 20 ml. of isopropanol. M.P. 159–160° C.

EXAMPLE 7

21 - [1-phenyl-1-hydroxypropyl - (2) - aminomethyl]-2β-acetoxy-5α-pregnen-16-one-20

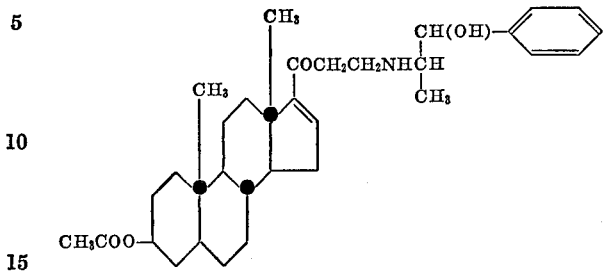

10 grams (0.0279 mol) of 3β-acetoxy-5α(allo)-pregnen-16-one-20, 1 gram of paraformaldehyde and 5.23 grams (0.0279 mol) of 1-norephedrine. HCl were heated at reflux for 4 hours in 100 ml. of isopropanol whereby after 2 hours there was added an additional 1 gram of paraformaldehyde. Upon cooling the HCl salt precipitated out. It was treated with acetone. The residue (4.8 grams) insoluble in acetone was subsequently recrystallized from 270 ml. of methanol. M.P. 247–248° C.

EXAMPLE 8

21 - [1 - phenyl - 1 - hydroxypropyl - (2) - aminomethyl]-3β-acetoxy-5β-pregnen-16-one-20

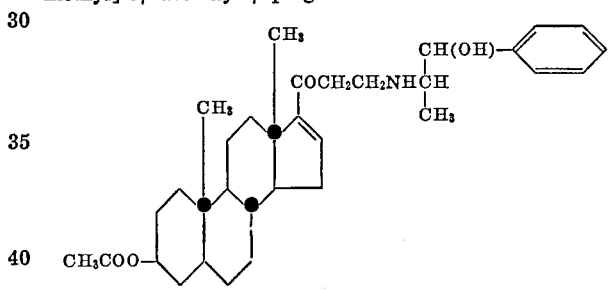

(a) 10 grams (0.0279 mol) of 3-β-acetoxy-5β-pregnen-16-one-20, 1+1 grams paraformaldehyde (added in 2 portions) and 5.23 grams (0.0279 mol) of 1-norephedrine. HCl were reacted in 100 ml. of isopropanol as in Example 7 and correspondingly worked up. 7.9 grams of the HCl salt were recrystallized from 200 ml. of methanol. M.P. 236–237° C.

(b) For deacetylation of the acetoxy group in the 3β position 22.5 grams (0.0436 mol) of the 21-[1-phenyl-1-hydroxypropyl - (2) - amino-methyl] - 3β - acetoxy-5β-pregnen-16-one-20. HCl were heated at reflux for 3 hours in a mixture of 600 ml. of methanol, 100 ml. of chloroform and 100 ml. of 10% HCl. After the solvent was distilled off the residue was treated with acetone and the 20 grams of 21-[1 - phenyl - 1 - hydroxy-propyl-(2)-aminomethyl]-3β-hydroxy-5β-pregnen - 16 - one-20. HCl recrystallized from 420 ml. of ethanol-methanol mixture (4:1). M.P. 226–228° C.

EXAMPLE 9

21 - [1 - phenyl - 1 - hydroxypropyl - (2) - aminomethyl]-3β-hydroxy-16α-methylpregnen-5-one-20

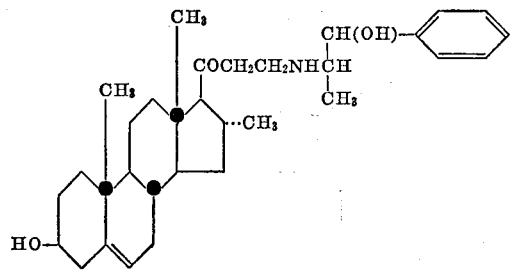

10 grams (0.03 mol) of 16α-methylpregnenolone, 1 gram of paraformaldehyde and 5.7 grams (0.03 mol) of 1-norephedrine. HCl were heated at reflux for 8 hours in 100 ml. of isopropanol. After each 2 hours 1 gram of paraformaldehyde was added. The solvent was distilled off, the residue treated with ether and allowed to stand for 2 days in 80 ml. of acetone. 5 grams of HCl salt were recrystallized from 25 ml. of glacial acetic acid M.P. 233–234° C.

EXAMPLE 10

21-[1-phenyl - 1 - hydroxypropyl - (2) - aminomethyl] 3β-acetoxy-17α-hydroxypregnen-5-one-20

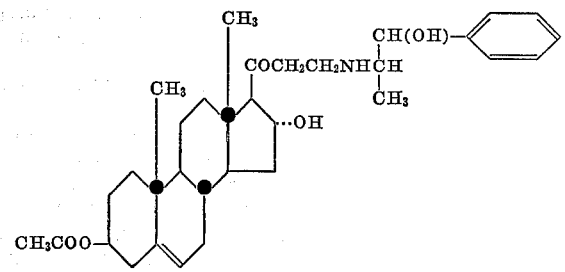

10 grams (0.0268 mol) of 3β-acetoxy-17α-hydroxy-pregnen-5-one-20, 1 gram of paraformaldehyde and 5 grams (0.0268 mol) of 1-norephedrine. HCl were heated at reflux for 6 hours in 180 ml. of butanol-2. Upon cooling the HCl salt precipitated out. It was extracted by boiling with acetone. The HCl salt remaining behind (4 grams) was recrystallized from 50 ml. of glacial acetic acid. M.P. 228–230° C.

EXAMPLE 11

21-[1-phenyl - 1 - hydroxypropyl-(2)-aminomethyl]-3β-acetoxypregnadien-5,16-one-20

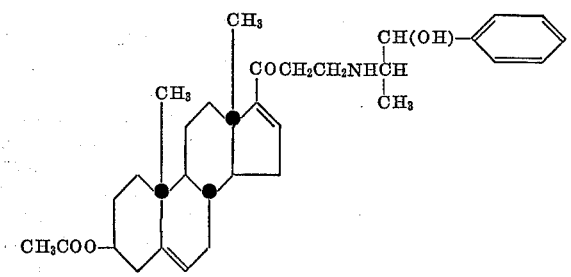

10 grams (0.0281 mol) of pregnadienolone acetate, 1 gram of paraformaldehyde and 5.25 grams (0.0281 mol) of 1-norephedrine. HCl were reacted in 100 ml. of isopropanol with addition of a further 1 gram of paraformaldehyde as in Example 7 and worked up as in that Example. 5.5 grams of HCl salt were recrystallized from 270 ml. of methanol. M.P. 240–241° C.

EXAMPLE 12

21-[1-phenyl - 1 - hydroxypropyl-(2)-aminomethyl]-3β-acetoxy-16-methyl-pregnadien-5,16-one-20

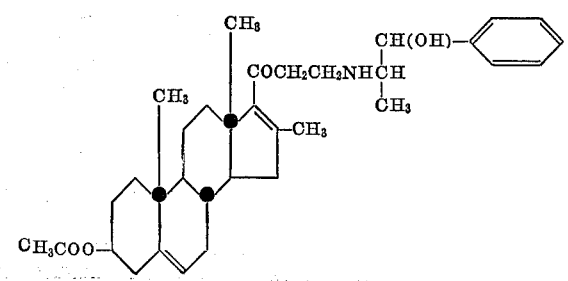

(a) 10 grams (0.027 mol) of 16-methylpregnadienolone acetate, 1 gram of paraformaldehyde and 5.1 grams (0.027 mol) of 1-norephedrine. HCl were heated at reflux for 8 hours in 100 ml. of isopropanol whereby twice at intervals of 2 hours 1 gram of paraformaldehyde was added. The HCl salt was suction filtered off hot, washed with acetone and the 7.5 grams of product recrystallized from 260 ml. of methanol. M.P. 220–222° C.

(b) For deacetylation of the acetoxy group in the 3β position 21 grams (0.0397 mol) of the 21-[1-phenyl-1-hydroxypropyl-(2)-aminomethyl]-3β-acetoxy - 16 - methylpregnadien-5,16-one-20. HCl were heated at reflux for 3 hours in a mixture of 600 ml. of methanol, 100 ml. of chloroform and 100 ml. of 10% HCl. Then the solvent was distilled off and the residue treated with acetone. 16 grams of 21-[1-phenyl-1-hydroxypropyl-(2)-aminomethyl]-3β-hydroxy-16-methylpregnadien - 5,16 - one-20. HCl were recrystallized successively from a mixture of ethanol-methanol (4:1) and glacial acetic acid. M.P. 185–186° C.

EXAMPLE 13

21 - [1 - phenyl-1-hydroxypropyl-(2-aminomethyl]-3β-acetoxy-6-methyl-pregnadien-5,16-one-20

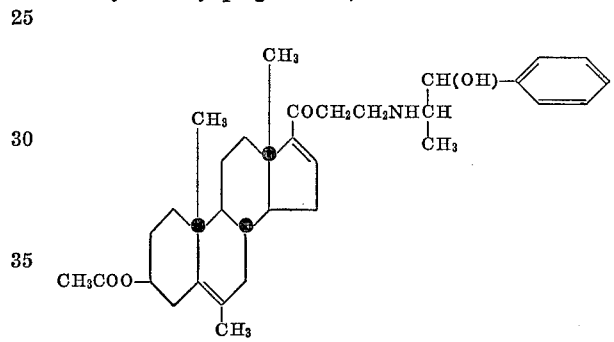

10 grams (0.027 mol) of 6-methyl pregnadienolacetate, 3 times 1 gram of paraformaldehyde and 5.1 grams (0.027 mol) of 1-norephedrine. HCl were reacted in 100 ml. of isopropanol in accordance with the procedure of Example 12 (1 gram of formaldehyde was added initially and the other two grams added in two steps of 2 hour intervals) and worked up. 6.2 grams of the HCl salt were recrystallized from 230 ml. of glacial acetic acid. M.P. 245–246° C.

EXAMPLE 14

2-[1 - phenyl - 1 - hydroxypropyl-(2)-amino-methyl] 17β-hydroxy-17α-methyl-androsten-4-one-3.

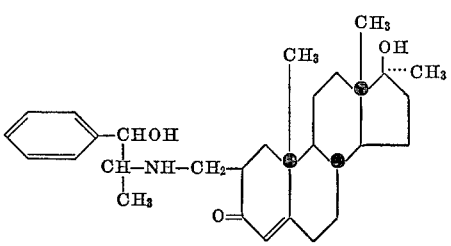

10 grams (0.033 mol) of 17α-methyl testosterone, 1 gram of paraformaldehyde and 6.2 grams (0.33 mol) of 1-norephedrin. HCl were heated for 8 hours at reflux in 100 ml. of isopropanol. Twice there were added at intervals of 2 hours 1 gram of paraformaldehyde. The solvent was distilled off, the residue treated with ether and then stirred with 250 ml. of water. 5.5 grams of insoluble HCl salt were formed and dissolved in 60 ml. of methyl ethyl ketone. The HCl salt which crystallized out was recrystallized from 100 ml. of isopropanol. M.P. 214–215° C.

EXAMPLE 15

16-[1-phenyl - 1 - hydroxypropyl-(2)-amino-methyl]
3β-hydroxyandrosten-5-one-17

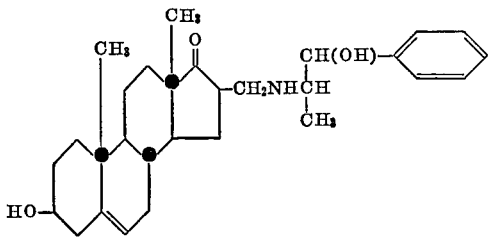

10 grams (0.0345 mol) of dehydro isoandrosterone, 1 gram of paraformaldehyde and 6.5 grams (0.0345 mol) of 1-norephedrine. HCl were heated for 8 hours at reflux in 100 ml. of isopropanol. There were twice added 1 gram portions of paraformaldehyde at intervals of 2 hours. The solvent was distilled off and the residue treated first with ether and then with acetone. 5 grams of the insoluble HCl salt were recrystallized from 230 ml. of isopropanol. M.P. 187–188° C.

EXAMPLE 16

16-[1-phenyl - 1 - hydroxypropyl-(2)-aminomethyl]-
3β-hydroxy-5α-androstanone-17

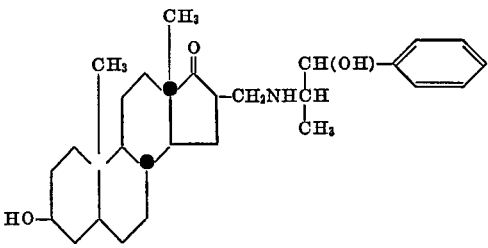

20 grams (0.069 mol) of isoandrosterone, 3 grams of paraformaldehyde and 12.9 grams (0.069 mol) of 1-norephedrine. HCl were heated at reflux for 8 hours in 200 ml. of isopropanol with the addition of 5 drops of isopropanolic HCl (about 7 normal). Twice at intervals of 2 hours 2 grams each of paraformaldehyde were added. Upon cooling 7 grams of the HCl salt crystallized out which was recrystallized first from 250 ml. of ethanol and then 50 ml. of glacial acetic acid. M.P. 197–198° C.

EXAMPLE 17

21 - [1-phenyl-1-hydroxypropyl-(2)-aminomethyl]-3β-acetoxy-3α-pregnanone-20.

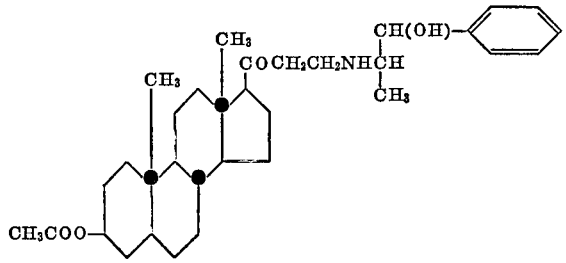

(a) 50 grams (0.139 mol) of 3β-acetoxy-5α(allo)pregnanone-20, 4.5 grams of paraformaldehyde and 26 grams (0.139 mol) of 1-norephedrine. HCl were heated at reflux for 8 hours in 100 ml. of isopropanol. Upon standing overnight the HCl salt crystallized out and was filtered off with suction. There were added to the mother liquor a further 10 grams of 1-norephedrine. HCl and 4.5 grams of paraformaldehyde and it was heated again for 8 hours at reflux. The solvent was distilled off and the residue treated with acetone. In this manner there were obtained a total of 29 grams of HCl salt which was recrystallized from 850 ml. of methanol-ethanol (3:2 by volume). M.P. 230–231° C.

(b) In order to deacetylate the acetoxy group in the 3β-position there were heated for 3 hours at reflux 10 grams (0.018 mol) of 21-[1-phenyl-1-hydroxy-propyl-(2)-aminomethyl]-3β-acetoxy-5α-pregnanone-20. HCl in 350 ml. of methanol and 50 ml. of 10% HCl. Then the solvent was distilled off and the residue treated with acetone. 8.5 grams of 21-[1-phenyl-1-hydroxypropyl-(2)-aminomethyl]-3β-hydroxy-5α-pregnanone-20 hydrochloride salt were recrystallized from 225 ml. of methanol. M.P. 225–226° C.

EXAMPLE 18

16-[1-phenyl-1-hydroxypropyl - (2) - aminomethyl]-3-methoxyestratrien-[1,3,5-(10)]-one-17.

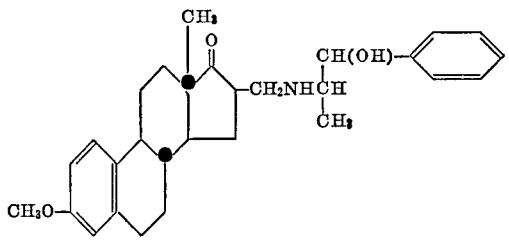

2.2 grams (7.7 millimols) of estrone methyl ether, 0.5 gram of paraformaldehyde and 1.4 grams (7.7 millimols) of 1-norephedrine. HCl were heated at reflux for 8 hours in 30 ml. of ethylene glycol dimethyl ether and 10 ml. of isopropanol. Upon standing overnight 1.5 grams of the HCl salt crystallized out. The salt was washed in order with methanol, ethylene glycol dimethyl ether and ether and recrystallized from 30 ml. of methanol. M.P. 192–194° C.

What is claimed is:
1. A compound having a formula selected from the group consisting of:

(1)

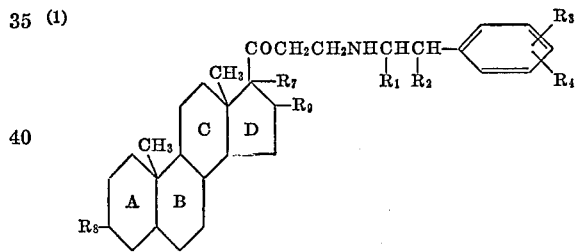

(2)

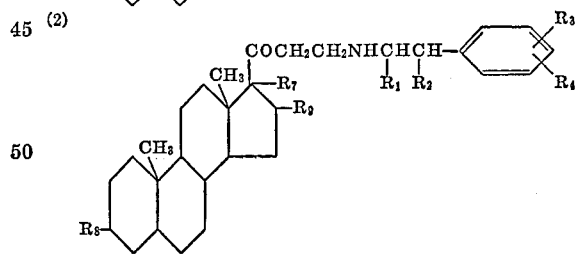

(3)

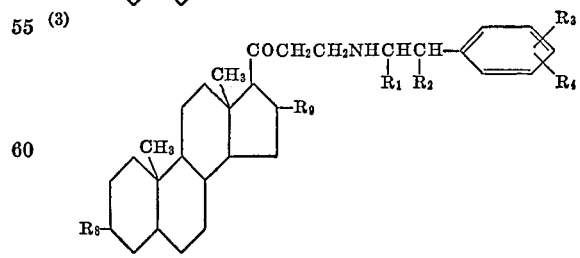

(4)

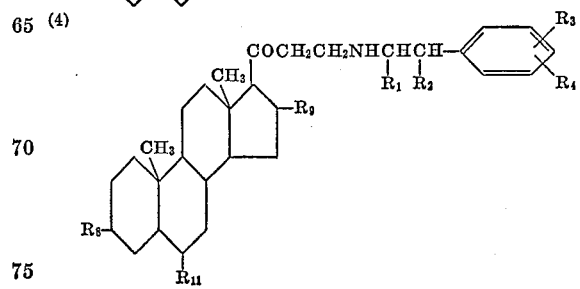

(5) 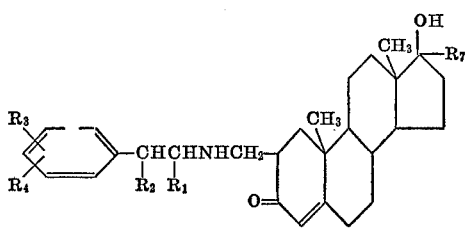

(6) 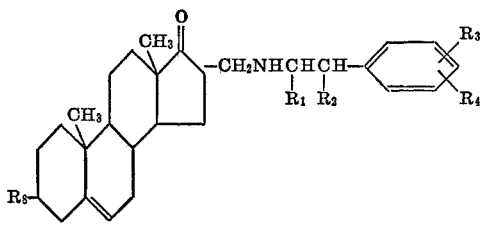

(7) 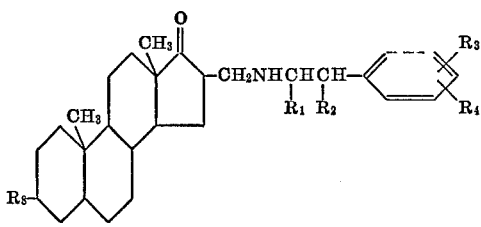

and (8) 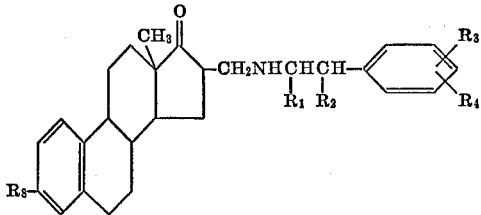

and belonging to the etiocholane or etioallocholane series, where $R_1$ is selected from the group consisting of hydrogen and lower alkyl, $R_2$ is selected from the group consisting of hydrogen and hydroxyl, $R_3$ and $R_4$ are selected from the group consisting of hydrogen, halogen, hydroxyl, lower alkyl and lower alkoxy, $R_8$ is selected from the group consisting of hydroxyl lower alkoxy and $R_{10}COO$—, where $R_{10}$ is lower alkyl, $R_7$ is selected from the group consisting of hydrogen and hydroxyl, $R_9$ is selected from the group consisting of hydrogen and lower alkyl and $R_{11}$ is selected from the group consisting of hydrogen and lower alkyl.

2. A compound according to claim 1 which has Formula 1 and the steroid ring system is a member of the group consisting of (a) those devoid of carbon to carbon double bonds, (b) those having a double bond between the 5 and 6 positions, (c) those having a double bond between the 16 and 17 positions (d) those having double bonds between both the 5 and 6 positions and the 16 and 17 positions.

3. A compound according to claim 2 wherein $R_1$, $R_2$, $R_3$, $R_4$ and $R_7$ are the same as defined therein, $R_8$ is selected from the group consisting of hydroxyl and $$R_{10}COO—,$$

where $R_{10}$ has 1 to 6 carbon atoms and $R_9$ is selected from the group consisting of hydrogen and alkyl of 1 to 5 carbon atoms.

4. A compound according to claim 3 wherein $R_1$, $R_2$, $R_3$, $R_4$, $R_8$, $R_9$ and $R_{10}$ are as defined therein and $R_7$ is hydrogen.

5. A compound according to claim 1 having Formula 2, $R_1$, $R_2$, $R_3$, $R_4$, $R_7$ and $R_9$ are the same as defined therein and $R_8$ is selected from the group consisting of hydroxyl and $R_{10}COO$—, where $R_{10}$ is lower alkyl.

6. A compound according to claim 5 wherein $R_1$, $R_2$, $R_3$, $R_4$, $R_7$, $R_9$ and $R_{10}$ are as defined therein and $R_7$ is hydrogen.

7. A compound according to claim 1 having Formula 3, $R_1$, $R_2$, $R_3$, $R_4$ and $R_9$ are the same as defined therein, $R_8$ is selected from the group consisting of hydroxyl and $R_{10}COO$—, where $R_{10}$ is lower alkyl and the steroid ring system is a member of the group consisting of (a) those having a double bond between the 5 and 6 positions, (b) those having a double bond between the 16 and 17 positions, and (c) those having double bonds between both the 5 and 6 positions and the 16 and 17 positions.

8. A compound according to claim 1 having Formula 4, $R_1$, $R_2$, $R_3$, $R_4$, $R_9$ and $R_{11}$ are the same as defined therein, $R_8$ is selected from the group consisting of hydroxyl and $R_{10}COO$—, where $R_{10}$ is lower alkyl and the steroid ring system is a member of the group consisting of (a) those having a double bond between the 5 and 6 positions, (b) those having a double bond between the 16 and 17 positions and (c) those having double bonds between both the 5 and 6 positions and the 16 and 17 positions.

9. A compound according to claim 1 having Formula 5, where $R_1$, $R_2$, $R_3$ and $R_4$ are the same as defined therein and $R_7$ is lower alkyl.

10. A compound according to claim 1 having Formula 6.

11. A compound according to claim 1 having Formula 7.

12. A compound according to claim 1 having Formula 8.

References Cited
UNITED STATES PATENTS 3,562,260  2/1971  De Ruggieri et al. __ 260—239.55

ELBERT L. ROBERTS, Primary Examiner

U.S. Cl. X.R.

260—397.2, 397.45; 404—242